United States Patent Office 3,605,422
Patented Sept. 20, 1971

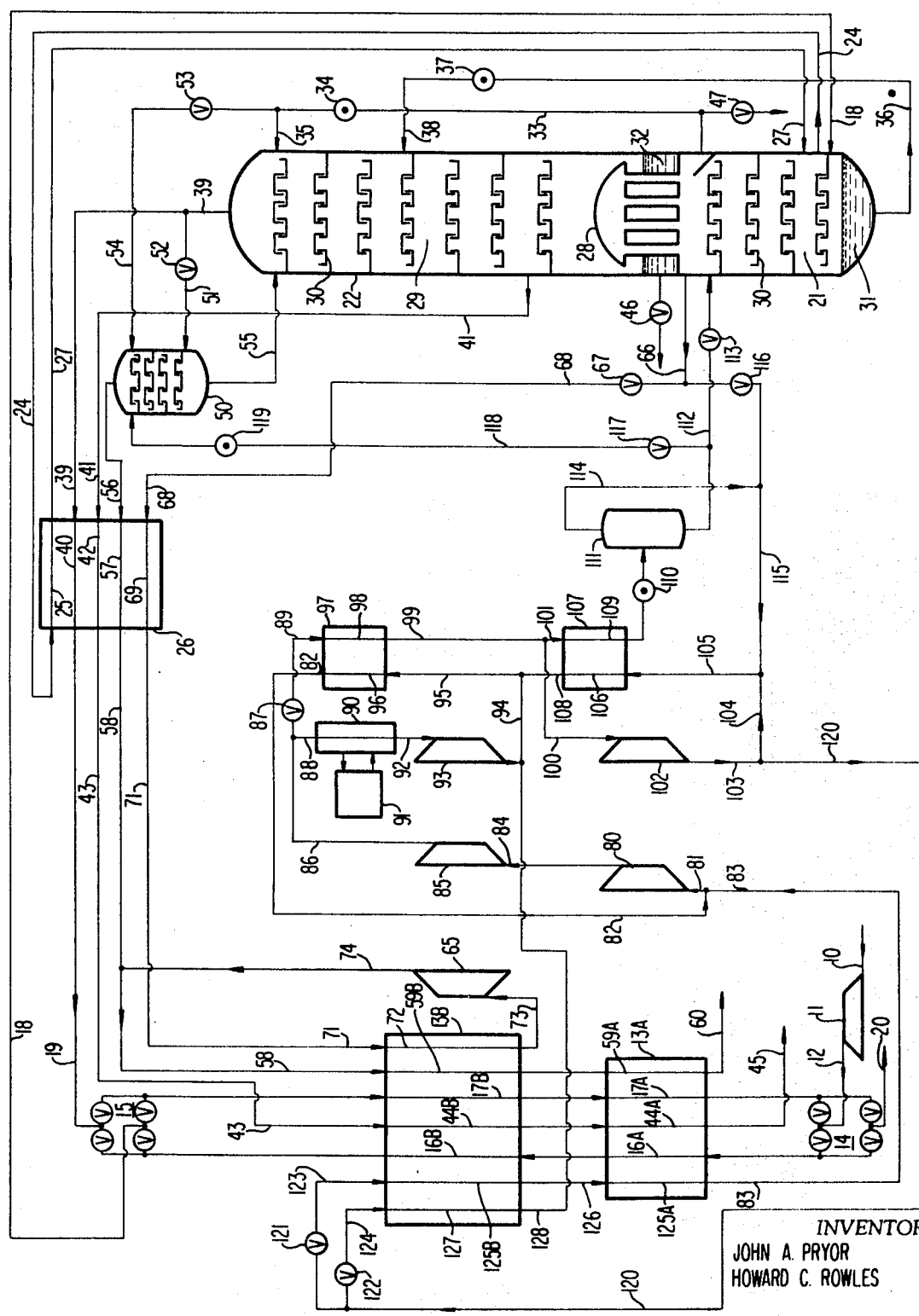

3,605,422
LOW TEMPERATURE PROCESS FOR THE SEPARATION OF GASEOUS MIXTURES
John A. Pryor, Emmaus, and Howard C. Rowles, Center Valley, Pa., assignors to Air Products and Chemicals, Inc., Allentown, Pa.
Filed Feb. 28, 1968, Ser. No. 708,866
Int. Cl. F25j 3/04, 5/00
U.S. Cl. 62—13    12 Claims

ABSTRACT OF THE DISCLOSURE

Process for the separation of a gas mixture under low pressure into components by a low temperature fractionating operation including an integrated refrigeration system which increases the liquid producing capabilities of the process for producing relatively large quantities of high purity products in liquid phase without decreasing efficiency of the fractionating operation and without sacrificing purity or yield of desired products.

BACKGROUND OF THE INVENTION

This invention relates to an improved process for the separation under low pressure of gaseous mixtures into different boiling point components by low temperature fractionation. More particularly, the present invention relates to a low pressure fractionating process for producing at least one component of a gas mixture in gaseous phase and high purity with minimum power requirements which possesses the capability of producing as product relatively large, varying quantities of components in liquid phase without disturbing the efficiency of the process, without decreasing yield and without sacrificing purity of the products.

It is known in the art that a component of high purity of a gas mixture may be obtained in gaseous phase with high yield and minimum expenditure of power by a low temperature fractionating process employing a high pressure fractionating zone and a low pressure fractionating zone in which the gas mixture is compressed, by the use of centrifugal compressors, to a pressure only in excess of the pressure existing in the high pressure fractionating zone as required to compensate for normal pressure drops in the system. Such prior low pressure process is inherently capable of producing a very small portion of the product in liquid phase, such as from 1% to 2% of the total gas mixture fed to the process. It is frequently desirable to provide, as product, components in gaseous phase as well as in liquid phase in quantities greatly in excess of that inherently obtainable from such prior process. Arrangements have been proposed for increasing the liquid producing capabilities of low pressure separation processes; however, with such arrangements, the process operates at reduced efficiency or below design capacity in order to obtain high purity products in gaseous and liquid phase especially when varying quantities of liquid product are desired.

The present invention provides a low pressure process for separating components of a gas mixture in a low temperature fractionating operation in novel combination with a refrigeration system, forming an integral part of the fractionating operation, which increases the liquid making capabilities of the process to permit the delivering as product high purity components of the gas mixture in gaseous phase and in liquid phase in relatively large quantities and in varying amounts while operating at design capacity and high efficiency without sacrificing purity of the products whether in gaseous or liquid phase and while actually increasing the yield of desired products.

BRIEF DESCRIPTION OF THE DRAWING

The drawing discloses a preferred embodiment of the invention in the environment of the separation of air into oxygen and nitrogen components; it is to be expressly understood, however, that the novel process provided by the present invention may be employed for the separation of other gas mixtures into product components delivered in gaseous and liquid phase.

DESCRIPTION OF THE PREFERRED EMBODIMENT

With reference to the drawing, atmospheric air enters the cycle through conduit 10 and is compressed in compressor 11, preferably of the multi-stage centrifugal type, to about 95 p.s.i.a. and then is conducted by conduit 12 for flow through a heat exchange device or zone, comprising sections 13A and 13B, in countercurrent heat interchange with relatively cold fluids, described below, to effect cooling of the compressed air to slightly above its saturation temperature. The heat exchange device is of the switching type to effect removal of moisture and carbon dioxide from the air feed. As shown, depending upon the positions of switch valves 14 and 15, the compressed air flows through passageways 16A and 16B or 17A and 17B to conduit 18 alternately with relatively cold nitrogen waste gas from conduit 19, the nitrogen waste gas being exhausted from the cycle through conduit 20. The compressed air in conduit 18, at about $-273°$ F., is introduced into the bottom of the high pressure zone 21 of a two-stage fractionating column 22, at about 93 p.s.i.a. A small stream of gaseous air, comprising about 1%-2% of the total air feed, is withdrawn from the high pressure zone by conduit 24 and liquefied upon flowing through passageway 25 of liquefier 26 and then introduced by conduit 27 into the high pressure zone at about $-280°$ F.

The fractionating column may be of conventional construction including a reflux condenser 28 separating the high pressure zone 21 from an upper low pressure zone 29 and liquid-vapor contact means such as bubble-cap trays 30 in each zone. In the zone 21, the compressed air is separated into a liquid high boiling point fraction, crude oxygen, collecting in a pool 31 at about $-277°$ F., and a low boiling point gaseous fraction, essentially pure nitrogen containing no more than 2 p.p.m. oxygen, at about $-284°$ F., which is liquefied at least in part in the refluxing condenser 28 upon indirect heat interchange with liquid high boiling point component, liquid oxygen, collecting in a pool 32 in the base of the low pressure zone 29 at about $-287°$ F. and 24 p.s.i.a. The liquefied low boiling point nitrogen fraction provides reflux for the high pressure zone 21 and a part is withdrawn by conduit 33, reduced in pressure in valve 34 and introduced by conduit 35 at about $-316°$ F. into the top of the low pressure zone 29 as reflux. The crude oxygen liquid high boiling point fraction is introduced into the low pressure zone 29 at about $-307°$ F. and 20 p.s.i.a., by way of pressure reducing valve 37 and conduit 38, the liquid oxygen high boiling point component collecting in the pool 32 and a gaseous low boiling point fraction at about $-315°$ F., impure nitrogen, withdrawn from the top of the low pressure zone through conduit 39, the latter conduit conducting the waste nitrogen gas for flow through passageway 40 of the liquefier 26, where it is warmed to about $-279°$ F., and into conduit 19 for countercurrent switching heat interchange with the air feed as described above. High purity gaseous oxygen at a temperature of about $-287°$ F. is withdrawn from the low pressure zone by conduit 41, warmed to about $-279°$ F. upon flowing through passageway 42 of the liquefier 26, and then conducted by conduit 43 for flow through passageways 44B and 44A of the heat exchange device 13A-13B, in countercurrent heat interchange with the air feed; the gaseous oxygen product is withdrawn from the cycle through conduit 45 at substantially ambient temperature. Liquid oxygen product may be withdrawn from the pool 32 through valved conduit 46 and liquid nitrogen product at about −284° F. may be withdrawn through valved conduit 47.

An auxiliary fractionating column 50 functions to produce a high purity gaseous nitrogen product by scrubbing impure nitrogen gas with high purity liquid nitrogen. Impure nitrogen gas from conduit 39 is fed by conduit 51, having a control valve 52, to the bottom of the column 50 and liquid nitrogen reflux is fed to the column through control valve 53 and conduit 54. Oxygen containing liquid nitrogen at a temperature of about −315° F. is withdrawn from the column 50 and returned to the low pressure zone 29 by conduit 55 and high purity gaseous nitrogen at about −316° F. is withdrawn from the column by conduit 56, warmed to about −279° F. upon flowing through passageway 57 of the liquefier 26 and then conducted by conduit 58 for flow through passageways 59A and 59B of heat exchange device 13A-13B in countercurrent heat interchange with the air feed, the high purity gaseous nitrogen being withdrawn as product through conduit 60 at substantially ambient temperature.

Refrigeration for the cycle is obtained by expanding with production of external work high pressure gaseous nitrogen withdrawn from the high pressure zone 21 in expansion engine 65, preferably of the turbine type. The cold effluent of the expansion engine 65 at about −248° F. and at about 19 p.s.i.a. is conducted by conduit 74 and merged with the pure nitrogen gas in conduit 58 and flowed through the passageways 59B and 59A therewith. High purity nitrogen gas is withdrawn from the high pressure zone 21 at about 92 p.s.i.a. and −284° F. through conduit 66, passed through control valve 67 and conduit 68 and then warmed to about −279° F. upon flowing through passageway 69 of the liquefier 26. From the liquefier, the pure nitrogen gas is conducted by conduit 71 to the cold end of the heat exchanger section 13B, further warmed to about −164° F. upon flowing through the passageway 72, and then fed by conduit 73 to the inlet of the expansion engine 65. In the expansion engine, the pure nitrogen gas is reduced in pressure to about 19 p.s.i.a. and the effluent of the expansion at a temperature of about −248° F. is conducted by conduit 74 and merged with the pure nitrogen gas flowing through conduit 58 onto passageways 59A and 59B of the air feed-product gas heat exchanger. The flow of the pressurized nitrogen gas through the passageway 72 unbalances the heat exchange device to insure deriming of the passageways 16B and 17B by the outwardly flowing gaseous waste nitrogen and also increases the temperature of the nitrogen gas for optimum expansion in the engine 65.

The cycle as described above is of generally conventional construction and is capable of producing high purity gaseous oxygen product at relatively low cost primarily because of the low horsepower required for compressing the air feed. The cycle is capable of producing liquid which may be utilized to provide liquid oxygen product withdrawn through conduit 46, liquid nitrogen product withdrawn through conduit 47 or high purity gaseous nitrogen from the fractionating column 50, without sacrificing purity of the gaseous oxygen product. However, the liquid producing capability of the cycle is extremely limited, being no greater than the portion of the air feed liquefied upon flowing through passageway 25 of the liquefier which comprises from 1% to 2% of the total air feed.

As mentioned above, it is an object of the present invention to provide, in combination with a low pressure fractionating cycle of the character described above, a refrigeration system integrated in a novel manner with the fractionating cycle to substantially increase the liquid producing capability of the process and thereby make possible the producing of substantial quantities of high purity liquid oxygen product, high purity liquid nitrogen product and high purity gaseous nitrogen product without decreasing efficiency of the fractionating cycle or increasing horsepower requirements or sacrificing purity of products while permitting the fractionating cycle to operate at designed air feed capacity for optimum efficiency and the withdrawal of varying quantities of liquid product to meet demands. The foregoing is accomplished by a refrigeration system, employing pure nitrogen gas derived from the fractionating operation as the refrigerant, which provides liquid for the process and balancing of the air feed heat exchange system.

With further reference to the drawing, the refrigeration system includes a first stage compressor 80 fed by conduit 81 with high purity nitrogen gas at a pressure of about 80 p.s.i.a., the nitrogen gas being supplied by conduits 82 and 83 in a manner described below. The nitrogen gas is discharged from the compressor 80 at a pressure of about 400 p.s.i.a. and is fed by conduit 84 to the suction side of second stage compressor 85 from which the nitrogen gas is discharged in conduit 86 at about 590 p.s.i.a. The compressors 80 and 85 are preferably of the centrifugal type and are provided with after coolers, not shown. The high pressure nitrogen gas is divided by control valve 87 into a first portion flowing in conduit 88 and a second portion flowing in conduit 89. The first portion is cooled to about 10° F. upon flowing through heat exchange device 90 in heat interchange with an auxiliary refrigerant 91, which may be a Freon refrigerant, and is then conducted by conduit 92 to the inlet of expansion turbine 93 wherein the nitrogen gas is expanded with the production of external work to about 90 p.s.i.a. with a concomitant cooling to about −145° F. The effluent of the expansion turbine 93 is conducted by conduits 94 and 95 for flow through passageway 96 of heat exchange device 97 and, hence, to the suction inlet of compressor 80 by conduit 82. The second portion of the high pressure nitrogen gas is cooled to about −167° F. upon flowing through passageway 98 of the heat exchange device 97 to conduit 99 and thereby cooled and then divided into a first cold high pressure portion in conduit 100 and a second cold high pressure portion in conduit 101. The first portion is conducted by conduit 100 to expansion turbine 102 wherein the compressed nitrogen is expanded with the production of external work to a pressure of about 90 p.s.i.a. and closed to a temperature of about −279° F. A part of the cold effluent of the expansion turbine 102 in conduit 103 is passed by conduits 104 and 105 for flow through passageway 106 of heat exchange device 107 and then merged by conduit 108 with the cold nitrogen gas in the conduit 95. The second portion in the conduit 101 is cooled to about −276° F. upon flowing through passageway 109 of the heat exchange device 107 in countercurrent heat interchange with the relatively cold fluid flowing through the passageway 106 and then expanded in valve 110 to about 92 p.s.i.a. and about −284° F. The partially liquefied nitrogen is then fed to a phase separator 111 from which the liquid nitrogen is withdrawn by conduit 112, having a control valve 113, and introduced into the top of the high pressure zone 21 of the fractionating column. The unliquefied nitrogen is withdrawn from the phase separator by conduit 114 and then conducted by conduit 115 for merger in conduit 105 with the cold effluent flowing into passageway 106. The conduit 115 is joined to the conduit 66 through a control valve 116 to feed cold nitrogen gas from the high pressure zone to the refrigeration system. A portion of the liquefied nitrogen in the conduit 112 may be passed through control valve 117, conduit 118 and pressure reducing valve 119 to the top of the auxiliary fractionating column 50 to provide reflux in the production of gaseous high purity nitrogen product.

For purposes that will be described below, a portion of the cold effluent of the expansion engine 102 is conducted by conduit 120 and divided by control valves 121 and 122 for flow to conduits 123 and 124, respectively. The conduit 123 is connected to the cold end of passageway 125B of the heat exchange section 13B which is connected by conduit 126 to passageway 125A of the heat exchange section 13A, the latter passageway being connected to the conduit 83 which provides a portion of the feed to the inlet of the compressor 80 as described above. The conduit 124 is connected to the cold end of passageway 127 of the heat exchange section 13B and the latter passageway is connected by conduit 128 to the conduit 94. This arrangement makes it possible to increase the yield of the process as described below.

When the cycle is operated as a gas producing plant, valves 113, 116 and 117 are closed to isolate the refrigeration system from the cycle. In such operation, the cycle is capable of producing gaseous oxygen of high purity, such as 99.5%, which is delivered from the cycle in conduit 45. Also, as mentioned above, when so operated, the cycle possesses relatively small liquid producing capacity, corresponding to the portion of the air liquefied in the liquefier 26 which is ordinarily no more than 2% of the total air feed. Thus, it is possible to withdraw a corresponding mass of liquid high purity product from the fractionating column, either liquid oxygen through conduit 46 or liquid nitrogen through conduit 47, or to produce high purity gaseous nitrogen product by utilizing the liquid as reflux for the auxiliary fractionating column 50. Expansion in the turbine 65 of high pressure nitrogen gas, withdrawn from the high pressure zone 21 and warmed in passageway 72, provides refrigeration for the process. The withdrawal of nitrogen gas from the high pressure zone decreases available liquid nitrogen for refluxing the fractionating operation and limits the yield of high purity oxygen product; however, the effluent of the expansion turbine 65 is delivered from the process as high purity nitrogen gas.

When it is desired to increase liquid production, valve 116 is opened to feed high pressure gaseous nitrogen from the high pressure zone 21 to the refrigeration system and the valve 113 is opened to conduit liquid nitrogen from the phase separator 111 into the high pressure zone. The addition of liquid nitrogen into the high pressure zone 21 permits the withdrawal of a corresponding mass of liquid oxygen through conduit 46 or liquid nitrogen through conduit 47. Also, liquid nitrogen produced by the refrigeration system may be used as reflux for the fractionating column 50, via control valve 117, conduit 118 and pressure reducing valve 119, to increase production of high purity nitrogen gas.

During operation of the refrigeration system, the valve 121 is opened to flow effluent from the expansion engine 102 through the passageways 125B and 125A in countercurrent heat exchange with the air feed stream. The mass of the fluid flow through the passageways 125B and 125A is controlled in accordance with the additional liquid production withdrawn from the cycle, to compensate for the reduction in mass of cold components flowing through the heat exchange device 13A-13B as a consequence of the additional liquid product withdrawal. This feature makes it possible to maintain the heat exchange device 13A-13B balanced according to optimum design conditions, irrespective of the quantity of liquid product that may be withdrawn, so that the air feed stream is always cooled to a substantially constant temperature and there are no disturbing effects on the fractionating operation requiring adjustments, such as in liquid-vapor ratios, in order to maintain separation into components of substantially constant purity.

As mentioned above, the additional feature provided by the present invention of flowing effluent from the expansion turbine 102 through the passageway 127 of the heat exchange section 13B makes it possible to increase the yield of high purity products. This is accomplished by using the flow through the passageway 127 to perform the unbalancing function of the flow through passageway 72 and of utilizing the refrigeration system to supply the refrigeration supplied by the expansion turbine 65. This is accomplished by closing valve 67 to isolate the expansion turbine 65 from the process, by adjusting the valve 122 so that the flow through passageway 127 is sufficient to unbalance the heat exchange device and by adjusting the valve 121 so that the flow through passageways 125B and 125A is equivalent to the refrigeration effect of the flow of effluent from the expansion turbine 65 through the passageways 59B and 59A. Isolation of the expansion turbine 65 makes available as potential reflux the total nitrogen separated in the high pressure zone 21 and the yield of high purity oxygen product may accordingly be increased.

Although only one embodiment of the invention has been disclosed and described herein, it will be appreciated that various changes and substitutions may be made without departing from the spirit of the invention as well understood by those skilled in the art. For example, a single heat exchange device may be employed in place of the heat exchange sections 13A and 13B, a plurality of single or sectional heat exchange devices may be connected in parallel, a single passageway with suitable valves may be used to perform the function of the passageways 72 and 127 and that the auxiliary fractionating column 50 may comprise an extension of the low pressure fractionating zone 29. Furthermore, liquid nitrogen product may, in place of the conduit 47, be withdrawn from the conduit 112. In addition, increased high purity gaseous nitrogen product may be obtained by withdrawing impure nitrogen liquid from a medial point of the high pressure zone 21 and passing such impure liquid to the low pressure zone 29 by way of conduit 33, valve 34 and conduit 35; in such operation, the valve 53 would be closed, pure liquid nitrogen reflux would be fed to the auxiliary column through conduit 118 and high purity liquid nitrogen product would be withdrawn from the high pressure zone by a separate conduit or from the conduit 112. Therefore, it is to be understood that the limits of the invention are defined by the scope of the appended claims.

What is claimed is:

1. Process for the separation of a gas mixture by low temperature fractionation into low boiling component and a high boiling component comprising the steps of
providing a compressed gas mixture feed stream,
cooling the compressed gas mixture feed stream by heat interchange with at least one relatively cold component of the gas mixture,
fractionating the cooled gas mixture feed stream in a fractionating zone to separate the gas mixture into low boiling component and high boiling component,
withdrawing from the fractionating zone a separated component in gaseous phase,
warming the withdrawn component,
compressing the warmed withdrawn component,
cooling and expanding the warmed withdrawn component to partly liquefy the withdrawn component and provide a liquid part and a cold gaseous part,
returning liquid part to the fractionating zone,
passing at least a portion of the cold gaseous part in heat interchange with the compressed gas mixture feed stream to warm the portion of the cold gaseous part and effect cooling of the compressed gas mixture feed stream,
merging the warmed portion with the withdrawn component prior to compressing the withdrawn component,
withdrawing a separated component in liquid phase from the fractionating zone as product of the process,
and controlling the flow of the portion of the cold gaseous part passed in heat interchange with the compressed gas mixture feed stream to compensate for reduction in flow of cold components passed in heat interchange with the compressed gas mixture feed stream as a result of liquid product withdrawal.

2. Process for the separation of a gas mixture as defined in claim 1 in which the cold gaseous part comprises the effluent of a work expansion step.

3. Process for the separation of a gas mixture as defined in claim 2 in which the withdrawn component comprises the low boiling point component.

4. Process for the separation of a gas mixture as defined in claim 1 in which
the compressed gas mixture feed stream is cooled by heat interchange with at least one component of the gas mixture in a switching heat exchange zone,
and in which the heat exchange zone is unbalanced by passing a second portion of the cold gaseous part through the heat exchange zone in countercurrent heat interchange with the compressed gas mixture feed stream.

5. Process for the separation of a gas mixture as defined in claim 1 in which refrigeration for the process is provided by compressing, cooling and expanding the component withdrawn from the fractionating zone in gaseous phase.

6. Process for the separation of air by low temperature fractionation into low boiling component and a high boiling component comprising the steps of
providing a compressed air feed stream,
cooling the compressed air feed stream by heat interchange with at least one relatively cold component of air,
separating the cooled air feed stream in a fractionating operation having a high pressure fractionating zone and a low pressure fractionating zone into low boiling nitrogen component of high purity and high boiling oxygen component of high purity,
withdrawing from the high pressure fractionating zone high purity nitrogen in gaseous phase,
warming the withdrawn high purity gaseous nitrogen,
compressing the warmed high purity gaseous nitrogen,
cooling and expanding the warmed high purity gaseous nitrogen to partly liquefy the high purity nitrogen and provide a liquid part and a cold gaseous part,
returning liquid part to the high pressure fractionating zone,
passing at least a portion of the cold gaseous part in heat interchange with the compressed air feed stream to warm the portion of the cold gaseous part and effect cooling of the compressed air feed stream,
merging the warmed portion of the cold gaseous part with the withdrawn high purity gaseous nitrogen prior to compressing the withdrawn high purity gaseous nitrogen,
withdrawing as product from the fractionating operation a separated component in liquid phase,
controlling the flow of the portion of the cold gaseous part passed in heat interchange with the compressed air feed stream to compensate for reduction in flow of cold components passed in heat interchange with the compressed air feed stream as a result of liquid product withdrawal.

7. Process for the separation of air as defined in claim 6 in which the portion of the cold gaseous part comprises the effluent of a work expansion step.

8. Process for the separation of air as defined in claim 6 in which the cold gaseous part is at a pressure corresponding substantially to the pressure of the high pressure fractionating zone.

9. Process for the separation of air as defined in claim 6 in which a portion of the liquid part is used as reflux liquid in a fractionating operation to purify impure gaseous nitrogen produced in the low temperature fractionating zone.

10. Process for the separation of air as defined in claim 6 in which
the compressed air feed stream is cooled by heat exchange with at least one component of air in a switching heat exchange zone,
and in which the heat exchange zone is unbalanced by passing a second portion of the cold gaseous part through the switching heat exchange zone.

11. Process for the separation of air as defined in claim 6 in which
refrigeration for the process is obtained by compressing, cooling and expanding the high purity nitrogen gas withdrawn from the high pressure fractionating zone in a closed circuit with the high pressure fractionating zone.

12. In combination
a fractionating system for separating air into oxygen and nitrogen components including a heat exchanger for cooling the air and a two-stage fractionating column having a high pressure stage and a low pressure stage,
means for withdrawing liquid product from said fractionating column,
means for flowing at least one relatively cold component of air from the column through the heat exchanger of the fractionating system in countercurrent heat exchange with the air,
a refrigeration system including compressor means, work expansion means communicating with said compressor means to act on a portion of the output of said compressor means to provide cold gaseous effluent and valve expansion means communicating with said compressor means to act on a portion of the output of said compressor means to produce liquid,
means for feeding gaseous nitrogen from the high pressure stage to the refrigeration system,
means for feeding liquid from the refrigeration system to the high pressure stage,
means for flowing cold gaseous effluent from the refrigeration system through the heat exchanger of the fractionating system in countercurrent heat exchange with the air and then returning the gaseous effluent to the inlet of the compressor means of the refrigeration system,
and means for controlling the means for flowing cold gaseous effluent to compensate for reduction in flow of cold components passed in heat interchange with the air as a result of liquid product withdrawn from said fractionating column.

References Cited

UNITED STATES PATENTS

| | | | |
|---|---|---|---|
| 2,482,303 | 9/1949 | Van Nuys | 62—30 |
| 2,823,523 | 2/1958 | Eakin et al. | 62—39 |
| 3,319,427 | 5/1967 | Cimler et al. | 62—39 |
| 3,364,685 | 1/1968 | Perret | 62—40 |
| 3,371,496 | 3/1968 | Seidel | 62—39 |
| 3,420,068 | 1/1969 | Petit | 62—40 |

WILBUR L. BASCOMB, Jr., Primary Examiner

U.S. Cl. X.R.

62—21, 30, 31, 37, 39